United States Patent Office 2,958,690
Patented Nov. 1, 1960

2,958,690

METHOD OF RECOVERING VITAMIN B-12 WITH MODIFIED WOOD LIGNIN

Martin Faye, Cambria Heights, N.Y., and Joseph Bayne Doughty, Charleston, S.C., assignors to West Virginia Pulp and Paper Company, New York, N.Y., a corporation of Delaware No Drawing. Filed June 17, 1953, Ser. No. 362,416

2 Claims. (Cl. 260—211.5)

The present invention relates to the recovery of vitamin B-12 from solutions containing same and to compositions of matter consisting of vitamin B-12-lignin complexes useful as an animal food supplement. In recent years it has been demonstrated that the biologically active constituent of liver extract is a dark red crystalline substance which has been designated vitamin B-12. It has been shown to be active in stimulating the growth of man and animals, and its extensive use as a dietary supplement, especially in animal foods, has been proposed. It has high biological potency, as little as one-millionth of a gram being effective in increasing the red blood cell count in humans.

At present a common source of vitamin B-12 is the broths occurring as residues from the manufacture of streptomycin in which it is present on the order of 0.3 to 0.5 parts per million although other trade wastes and effluents also constitute sources of this substance and are susceptible to substantially the same treatment for its concentration and isolation as will be described hereinafter in connection with spent streptomycin broths. The isolation or even concentration of vitamin B-12 occurring in such extreme dilution presents many difficulties.

It has now been discovered that vitamin B-12 may be satisfactorily recovered by the precipitation thereof with lignin. Further it has been discovered that the lignin-vitamin B-12 complex itself constitutes a valuable animal food supplement.

The present invention will be best understood from the following illustrative example.

Example

A 375 gal. batch of spent streptomycin broth was divided into three 125 gal. parts and each put into separate glass-lined tanks fitted with propeller type agitators. The pH of the broth as received was 7.65 and was adjusted to 9.0 with 180 ml. of 50% sodium hydroxide in each case.

To one tank designated A was added 52.7 pounds (1.0 weight percent of the broth in lignin) of the 20% solution of lignin prepared by slurrying 24 lbs. of pine wood lignin in 81.5 pounds of water and adding 14.5 pounds of 28% ammonium hydroxide with good agitation. The solution as prepared was very fluid and had a pH of 10.6.

Into the second tank designated B was added 39.6 pounds (0.75 weight percent of the broth in lignin) of the 20% lignin solution.

To the third tank designated C was added 26.4 pounds (0.5 weight percent of the broth in lignin) of the 20% lignin solution.

The contents of each tank were agitated one hour to insure thorough mixing of the lignin solution and the broth.

At the end of the one hour mixing period, the pH of each tank was lowered to 4.0 by the addition of approximately 12 N sulfuric acid. Immediately after precipitation, each tank was again divided into equal parts designated as batches A and A-1, B and B-1, C and C-1, and put into separate glass lined tanks. The contents of tanks A, B and C were centrifuged as soon as possible and the recovered precipitate air dried whereas the contents of tanks A-1, B-1 and C-1 were agitated for 12 additional hours whereupon they were centrifuged and the recovered precipitate freeze-dried. The centrifuging was done at 25° C. at the rate of 1200–1700 r.p.m. per minute in a solid bowl centrifuge. The dried precipitate was then assayed biologically in known manner with the following results:

| Batch | Lignin Addition Percent of Broth | Lignin B-12 Cake Dry in Grams | Vitamin B-12 in Cake, Mg./lb. | Vitamin B-12 Recovery, Percent |
|---|---|---|---|---|
| A | 1.0 | 3,280 | 7.9 | 53.2 |
| A-1 | 1.0 | 2,926 | 8.4 | 50.5 |
| B | 0.75 | 1,573 | 9.9 | 32.0 |
| B-1 | 0.75 | 1,773 | 9.2 | 34.3 |
| C | 0.5 | 1,555 | 12.8 | 40.9 |
| C-1 | 0.5 | 1,838 | 10.6 | 39.9 |

Since the lignin is biologically neutral, the lignin-vitamin B-12 complex thus formed constitutes a valuable animal food supplement, tests having indicated that small animals, including chickens, are able to utilize substantially the entire quantity of B-12 present in the lignin cake. Vitamin B-12 may be recovered from the lignin cake in various ways as by eluting the cake with solvents of B-12 in which the lignin is insoluble, the preferred solvent being hot water, although n-butyl alcohol and diethyl acetic acid were effective in removing the bulk of the B-12 to the exclusion of the lignin. Or the lignin may be removed from the vitamin B-12 by the selective action of solvents which dissolve the lignin but leave behind the vitamin B-12, an example of this type of solvent being a mixture of acetone and methanol in equal parts. The lignin may also be treated with acetone to yield an acetone soluble fraction, this lignin being used to precipitate the vitamin B-12 and the lignin separated from the vitamin by treatment of the lignin-vitamin B-12 complex with acetone.

Other results using substantially the procedure of the above example were as follows:

| Concentration of lignin, g/100 ml. broth: | Percentage removal of vitamin B-12 streptomycin broth, 0.28 micrograms/ml. |
|---|---|
| 1.5 | 98 |
| 1.0 | 97 |
| 0.8 | -- |
| 0.6 | -- |
| 0.5 | 86 |

Lignins vary somewhat in composition depending upon their origin, method of isolation and subsequent treatment. Studies were made to determine the relative efficiencies of different lignins using a solution of 7½ mg. of vitamin B-12 in 500 ml. distilled water. The bright red color of such a solution makes possible the determination of the amount of vitamin present by colorimetric means. Varying amounts of the lignin solution were added to aliquot portions of the B-12 solution and precipitation brought about by adding 0.1 N sulfuric acid to give a pH of 2.0. The precipitate was removed by centrifuging the solution and the decantate obtained was assayed for B-12 using a Klett-Summerson photoelectric colorimeter. The value so obtained was then translated into parts of lignin required to precipitate 1 part of vitamin B-12.

On the basis of the foregoing, it was also found that a relationship existed between the amount of combined sulfur in the lignin molecule and its power to combine with vitamin B-12. Thus the least potent lignin in this respect was that obtained by cooking wood by the soda process.

Lignins having greater potency were obtained by cooking wood by the Kraft process in which the cooking liquor contained sodium sulfide and imparted to the recovered lignin a small amount of combined sulfur. When such lignins are further treated with Kraft cooking liquor, the amount of combined sulfur is increased slightly as is their potency in precipitating vitamin B-12. Finally, when Kraft lignin is heated with a strong solution of sodium sulfide, a lignin is obtained having the highest potency with respect to B-12 of any tested. The results of the foregoing may be summarized in the following table:

| Lignin | Preparation Process | Percent of Combined Sulfur | Parts lignin to remove one part vitamin B-12 from solution |
|---|---|---|---|
| Meadol, a lignin supplied by the Mead Co. | Soda cook wood | Trace | 3000 |
| Tomlinite, supplied by the Howard Smith Paper Co. | Semi-Kraft cook wood | 0.7 | 1700 |
| Indulin A, supplied by West Virginia Pulp and Paper Co. | Kraft cook wood | 1.4 | 500-700 |
| Modified Indulin A #1. | Lignin recovered from cook of (1:1) mixture of 50% solids black liquor and cooking liquor. | 1.6 | 300-500 |
| Modified Indulin A #2. | Lignin recovered from cook of (1:1) mixture of 27% solids black liquor and cooking liquor. | 1.6 | 200-500 |
| Modified Indulin A #3. | Indulin recovered from a cook of Indulin A in sodium sulfide solution. | 1.8 | 150 or less |

Modified Indulin Nos. 1 and 2 were prepared by cooking Indulin A with ordinary Kraft cooking liquor containing 24% sodium sulfide and 57% sodium hydroxide in the proportion named for a period of 6 hours and at a temperature of 170° C. and the lignin recovered by neutralization with sulfuric acid.

Modified Indulin No. 3 was prepared by (1) slurrying 454 grams of Indulin A in 2 liters of water; (2) dissolving 300 grams of sodium sulfide in 1 liter of water; and (3) adding the sodium sulfide to the Indulin slurry. This mixture was placed in the 1 gal. autoclave and cooked at 170° C. for 8 hrs. A 100 ml. aliquot of the cook was acidified to a pH of 2.0 by adding 16.7 ml. of 11 N sulfuric acid. Coagulation was brought about by heating to 90° C. and the material filtered and washed in a Buchner funnel using a cloth filter. The modified lignin was dried in a 105° C. oven overnight.

Lignin will also adsorb vitamin B-12 from a solution containing it merely by adding to the solution lignin which has already been precipitated. In this case, however, the vitamin B-12 recovery is about one-half that obtained when the lignin is precipitated in situ.

We claim:

1. The method of recovering vitamin B-12 from dilute aqueous solutions thereof, which comprises dispersing modified wood lignin throughout said solution, and forming a precipitate of a complex of said modified lignin and vitamin B-12, and separating the same from the solution, said modified lignin being a sulfidized lignin prepared by reacting, with an alkali sulfide, wood lignin isolated from spent cooking liquor obtained from the Kraft process of pulping wood, by heating a reaction mixture of said isolated wood lignin in a concentrated and strongly alkaline aqueous solution of the alkali sulfide, and then acidifying the reaction mixture to isolate said modified lignin.

2. The method as set forth in claim 1, in which said dilute aqueous solution of vitamin B-12 is spent streptomycin broth.

References Cited in the file of this patent

UNITED STATES PATENTS 2,530,416   Wolf _____ Nov. 21, 1950
2,664,420   Lott _____ Dec. 29, 1953

OTHER REFERENCES

Kunin: Ion Exchange Resins (1950), page 5.